United States Patent
Lee et al.

(10) Patent No.: US 11,761,898 B2
(45) Date of Patent: Sep. 19, 2023

(54) GAMMA-HYDROXYBUTYRIC ACID DETECTOR STICKER AND METHOD OF MANUFACTURING SAME

(71) Applicant: PHILMEDI Co., Ltd., Seongnam-si (KR)

(72) Inventors: Byung Hwan Lee, Yongin-si (KR); Dami Kim, Seongnam-si (KR); Se Jin Kim, Seongnam-si (KR)

(73) Assignee: PHILMEDI CO., LTD., Seongnam-si (KR)

( * ) Notice: Subject to any disclaimer, the term of this patent is extended or adjusted under 35 U.S.C. 154(b) by 244 days.

(21) Appl. No.: 17/115,598

(22) Filed: Dec. 8, 2020

(65) Prior Publication Data
US 2021/0293717 A1  Sep. 23, 2021

(30) Foreign Application Priority Data

Mar. 18, 2020 (KR) .................. 10-2020-0033348
Oct. 8, 2020 (KR) .................. 10-2020-0130490

(51) Int. Cl.
*B32B 29/00* (2006.01)
*B32B 7/12* (2006.01)
(Continued)

(52) U.S. Cl.
CPC ............... *G01N 21/78* (2013.01); *B32B 7/06* (2013.01); *B32B 7/12* (2013.01); *B32B 29/002* (2013.01);
(Continued)

(58) Field of Classification Search
CPC ..................................................... G01N 21/78
See application file for complete search history.

(56) References Cited

U.S. PATENT DOCUMENTS 6,617,123 B1   9/2003  Smith
2006/0057022 A1  3/2006  Williams et al.
(Continued)

FOREIGN PATENT DOCUMENTS

CN    105542555 B    12/2018
JP    2005313934 A    11/2005

OTHER PUBLICATIONS

The extended European Search report of 20212850.0, dated Apr. 29, 2021.
(Continued)

*Primary Examiner* — Ian A Rummel
(74) *Attorney, Agent, or Firm* — STIP Law Group, LLC

(57) ABSTRACT

A gamma-hydroxybutyric acid (GHB) detector sticker and a method of manufacturing the same are proposed. The GHB detector sticker includes a first release portion including a first release sheet, an adhesive portion formed on the first release sheet and including a first adhesive layer, and a detection portion formed on the first adhesive layer and including a thin film and a detection reagent composition dispersed in a part of or throughout the thin film. The GHB detector sticker can be attached at a location desired by the user and is effective at quickly detecting GHB based on a change in the color thereof when a liquid test sample is applied thereto after removal of a protective film (a second release sheet) in a situation in which inspection is necessary.

19 Claims, 11 Drawing Sheets

(51) Int. Cl.
B32B 7/06 (2019.01)
G01N 21/78 (2006.01)
(52) U.S. Cl.
CPC ..... B32B 2307/412 (2013.01); B32B 2405/00 (2013.01)

(56) References Cited

U.S. PATENT DOCUMENTS

| | | |
|---|---|---|
| 2013/0189166 A1 | 7/2013 | Thomas et al. |
| 2013/0209325 A1 | 8/2013 | Harooni |
| 2014/0119402 A1 | 5/2014 | Deng et al. |
| 2021/0330516 A1* | 10/2021 | Letourneau .......... A61B 5/6826 |

OTHER PUBLICATIONS

Anne Marie Child and Peter Child, Ability of commercially available "Date-Rape" drug test kits to detect gamma-hydroxybutyrate in popular drinks, Canadian Society of Forensic Sicence Journal, 2007, vol. 40, No. 3, pp. 131-141, Taylor & Francis Group, Abingdon, United Kingdom.

* cited by examiner

GAMMA-HYDROXYBUTYRIC ACID DETECTOR STICKER AND METHOD OF MANUFACTURING SAME

CROSS REFERENCE TO RELATED APPLICATIONS

The present application claims priority based on Korean Patent Application Nos. 10-2020-0130490 filed on Oct. 8, 2020, and 10-2020-0033348 filed on Mar. 18, 2020, the entire contents of which are incorporated herein for all purposes by this reference.

BACKGROUND OF THE DISCLOSURE

1. Technical Field

The present disclosure relates to a gamma-hydroxybutyric acid (GHB) detector sticker and a method of manufacturing the same, and more particularly to a GHB detector sticker that may be attached at a location desired by the user and is capable of detecting GHB based on a change in the color thereof when a test sample is applied thereto after removal of a protective film (a second release sheet) in a situation in which inspection is necessary.

2. Description of the Related Art

Recently, sex crimes using drugs at home and abroad have been controversial. In most cases of sex crimes using drugs, the perpetrator generally uses a method of pre-adding drugs to beverages or alcoholic drinks, causing the victim to ingest drugs, and then attempting an offense. Sex crimes using drugs are becoming a bigger social problem because victims suffer from crimes when they are unconscious or weak, and cannot remember facts related to the incident.

"Date rape drug" refers to a drug that is frequently administered to a person for the purpose of committing a sex crime because of the effect whereby the person receiving the administration loses voluntary control. GHB (gamma-hydroxybutyrate), also called "mulpong" in Korea, is a commonly known date rape drug.

GHB is a substance that occurs naturally in the central nervous system, and was originally developed as a therapeutic substance for patients with catalepsy or narcolepsy. Since GHB is colorless and odorless, it is difficult to know when it is added to liquids such as beverages, etc., and it is discharged in the urine after a certain period of time and is difficult to detect, so it is widely used for the purpose of committing sex crimes. Accordingly, there is a need for a method capable of quickly testing whether or not a drug has been added to beverages or alcoholic drinks.

SUMMARY OF THE DISCLOSURE

Therefore, an objective of the present disclosure is to provide a GHB detector sticker that may be attached at a location desired by the user and is capable of quickly detecting GHB based on a change in the color thereof when a liquid test sample is applied thereto after removal of a protective film (a second release sheet) in the situation in which inspection is necessary, and a method of manufacturing the same.

An aspect of the present disclosure provides a GHB detector sticker 10 for detecting GHB or salts thereof, including: a first release portion 100 including a first release sheet 110; an adhesive portion 200 formed on the first release sheet 110 and including a first adhesive layer 210; and a detection portion 300 formed on the first adhesive layer 210 and including a thin film 310 and a detection reagent composition dispersed in a part 311 of or throughout the thin film 310.

Also, the detection reagent composition may be dispersed in the part 311 of the thin film 310, and ink having the same color as the color of the detection reagent composition may be dispersed in the remaining part 312 of the thin film 310.

Also, the adhesive portion 200 and the detection portion 300 may have the same shapes as each other.

Also, each of the adhesive portion 200 and the detection portion 300 may have a circular shape, and the diameter of each of the adhesive portion 200 and the detection portion 300 may be 0.1 to 4 cm.

Also, the part 311 of the thin film 310 may be a semicircle, that is, half of the circular shape.

Also, the adhesive portion 200 may further include a substrate 220 formed on the first adhesive layer 210 and a second adhesive layer 230 formed on the substrate 220.

Also, the GHB detector sticker 10 may further include a second release portion 400, which is formed on the thin film 310 and includes a second release sheet 410.

Also, two or more selected from the group consisting of the adhesive portion 200, the detection portion 300 and the second release portion 400 may have shapes similar to each other.

Also, two or more selected from the group consisting of the adhesive portion 200, the detection portion 300 and the second release portion 400 may have the same shapes as each other.

Also, each of the adhesive portion 200, the detection portion 300 and the second release portion 400 may have a circular shape, and the diameter of each of the adhesive portion 200, the detection portion 300 and the second release portion 400 may be 0.1 to 4 cm.

Also, each of two or more selected from the group consisting of the adhesive portion 200, the detection portion 300 and the second release portion 400 may include a protrusion 201, 301, 401 protruding in a planar direction at a predetermined position thereof.

Also, the second release sheet 410 may be transparent.

Also, the second release portion 400 may further include a third adhesive layer 420 between the second release sheet 410 and the thin film 310.

Also, the thin film 310 may include at least one selected from the group consisting of nitrocellulose, polyvinylidene fluoride (PVDF), polypropylene (PP), polyethylene (PE), polysulfone (PS), polytetrafluoroethylene (PTFE), polyimide (PI), polyethylene terephthalate (PET), and poly(ethylene naphthalate) (PEN).

Also, the detection reagent composition may include at least one selected from the group consisting of a dehydrogenase of GHB (gamma-hydroxybutyric acid) or salts thereof, a coenzyme, a coenzyme dehydrogenase, a chromogen, and a dye.

Also, the dehydrogenase of GHB or salts thereof may include at least one selected from the group consisting of glucuronate reductase, hydroxyacid-oxoacid transhydrogenase, and 4-hydroxybutyrate-CoA ligase.

Also, the coenzyme may include at least one selected from the group consisting of NAD (nicotinamide adenine dinucleotide), NADP (nicotinamide adenine dinucleotide phosphate), nicotinamide 1,N6-ethenoadenine dinucleotide, and nicotinamide 1,N6-ethenoadenine dinucleotide phosphate.

Also, the coenzyme dehydrogenase may include at least one selected from the group consisting of diaphorase, cytochrome b5 reductase, aflatoxin aldehyde reductase, and flavin reductase.

Also, the chromogen may include at least one selected from the group consisting of a tetrazolium salt, tetrazolium blue chloride, methylene blue, 2,6-dichlorophenolindophenol, resazurin, Fe(III)-phenanthroline complex, alamarBlue, nitro blue tetrazolium, and nitro blue tetrazolium chloride (NBT).

Also, the dye may include at least one selected from the group consisting of 5,10,15,20-tetraphenyl-21H,23H-porphine, 5,10,15,20-tetrakis(4-sulfonatophenyl)-21H,23H-porphine manganese (III) chloride, zinc meso-tetraphenylporphine, malachite green, brilliant green, bromophenol blue, methyl orange, naphthyl red, bromocresol green, methyl red, chlorophenol red, bromocresol purple, bromothymol blue, phenol red, thymol blue, fluorescein, Eriochrome black T, Variamine blue B salt, Reichardt's dye, Nile red, and bromopyrogallol red.

Another aspect of the present disclosure provides a GHB detector sticker array 20 including GHB detector stickers 10, in which each of the GHB detector stickers may be as described above. Still another aspect of the present disclosure provides a method of manufacturing a GHB detector sticker 10 for detecting GHB or salts thereof, including: (a) manufacturing a thin film 310/first adhesive layer 210/first release sheet 110 by attaching a first release sheet 110 to one surface of a first adhesive layer 210 and attaching a thin film 310 to the remaining surface thereof; (b) manufacturing a detection portion 300/first adhesive layer 210/first release sheet 110 configured such that the detection portion includes the thin film 310 and a detection reagent composition dispersed in a part 311 of or throughout the thin film 310 by screen-printing the part 311 of or throughout the thin film 310 of the thin film 310/first adhesive layer 210/first release sheet 110 with the detection reagent composition; and (c) manufacturing the GHB detector sticker 10 by cutting the first adhesive layer 210 and the detection portion 300 of the detection portion 300/first adhesive layer 210/first release sheet 110.

Here, step (b) may include (b-1) forming a printing portion having a mesh hole having the same shape as the shape of the part 311 of the thin film in a screen mesh, (b-2) preparing a mixed solution including a detection reagent composition and a binder, (b-3) printing ink having the same color as the color of the detection reagent composition on a region corresponding to the remaining part 312 of the thin film 310 of the thin film 310/first adhesive layer 210/first release sheet 110, and (b-4) positioning the screen mesh having the printing portion on the thin film 310 of the thin film 310/first adhesive layer 210/first release sheet 110 and screen-printing a region corresponding to the printing portion with the mixed solution, thus manufacturing a detection portion 300/first adhesive layer 210/first release sheet 110 configured such that the detection portion includes the thin film 310 and the detection reagent composition dispersed in the part 311 of the thin film 310.

Also, step (b) may include (b-1') forming a printing portion having a mesh hole having the same shape as the shape of the detection portion 300 in a screen mesh, (b-2') preparing a mixed solution including a detection reagent composition and a binder, and (b-3') positioning the screen mesh having the printing portion on the thin film 310 of the thin film 310/first adhesive layer 210/first release sheet 110 and screen-printing a region corresponding to the printing portion with the mixed solution, thus manufacturing a detection portion 300/first adhesive layer 210/first release sheet 110 configured such that the detection portion includes the thin film 310 and the detection reagent composition dispersed throughout the thin film 310.

Also, step (c) may be (c') manufacturing the GHB detector sticker 10 by cutting the first adhesive layer 210 and the detection portion 300 of the detection portion 300/first adhesive layer 210/first release sheet 110 so as to have the same shapes as each other.

The method of the present disclosure may further include (b') coating the detection portion 300 of the detection portion 300/first adhesive layer 210/first release sheet 110 with a second release sheet 410, after step (b).

Also, step (c) may be (c") manufacturing the GHB detector sticker 10 by cutting two or more selected from the group consisting of the first adhesive layer 210, the detection portion 300 and the second release sheet 410 of the detection portion 300 coated with the second release sheet 410/first adhesive layer 210/first release sheet 110 so as to have shapes similar to each other.

According to the present disclosure, a GHB detector sticker can be attached at a location desired by the user and is effective at quickly detecting GHB based on a change in the color thereof when a liquid test sample is applied thereto after removal of a protective film (a second release sheet) in a situation in which inspection is necessary.

DESCRIPTION OF SPECIFIC EMBODIMENTS

Figure 1:
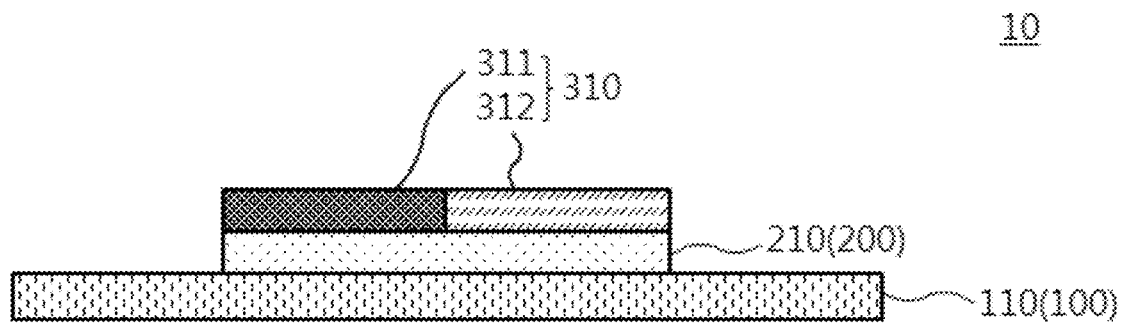
FIG. 1 is a side view showing a GHB detector sticker according to an embodiment of the present disclosure.
Figure 2:
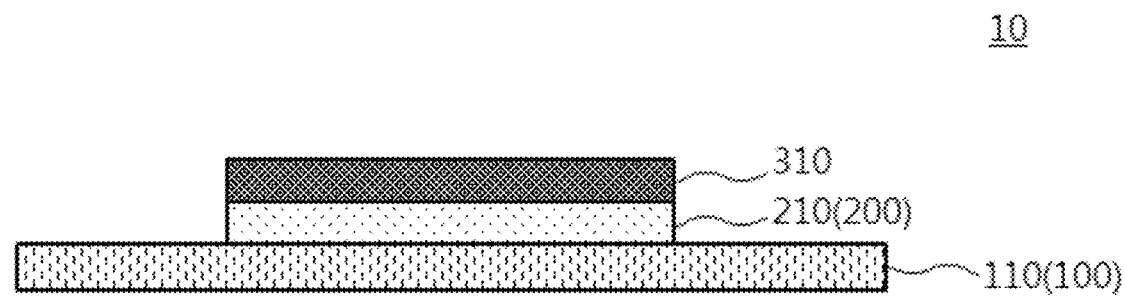
FIG. 2 is a side view showing a GHB detector sticker according to another embodiment of the present disclosure.
Figure 3:
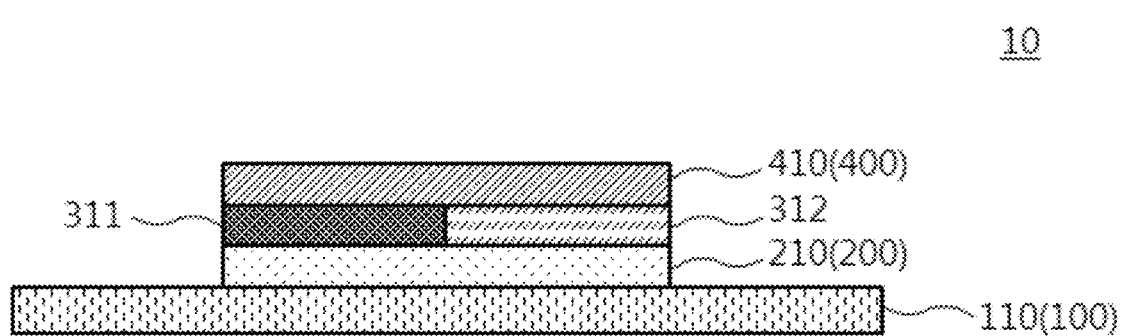
FIG. 3 is a side view showing a GHB detector sticker according to another embodiment of the present disclosure.
Figure 4:
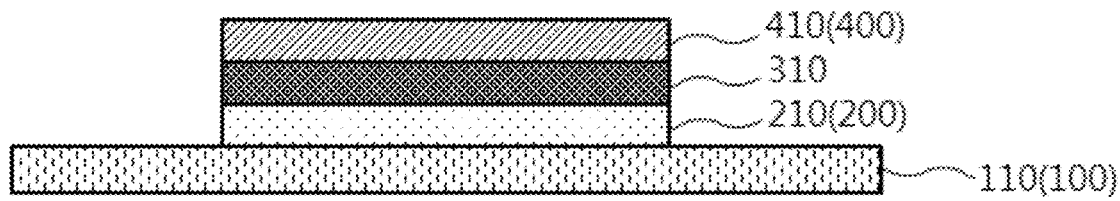
FIG. 4 is a side view showing a GHB detector sticker according to another embodiment of the present disclosure.
Figure 5:
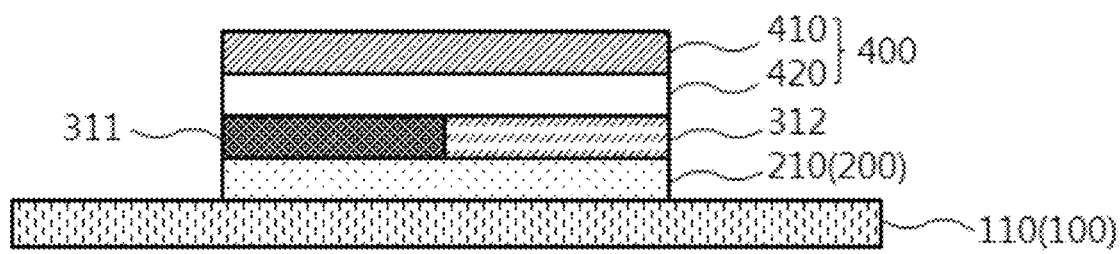
FIG. 5 is a side view showing a GHB detector sticker according to another embodiment of the present disclosure.
Figure 6:
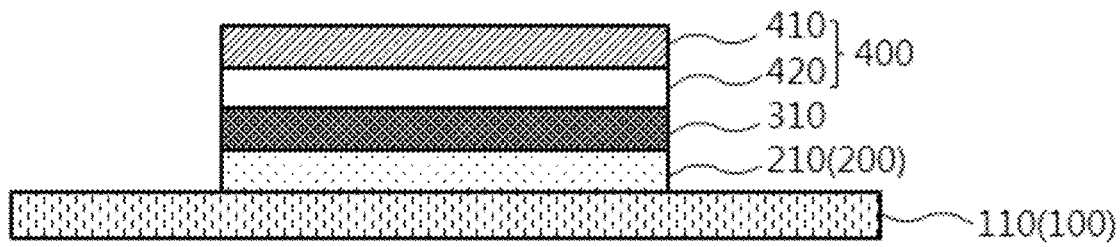
FIG. 6 is a side view showing a GHB detector sticker according to another embodiment of the present disclosure.
Figure 7:
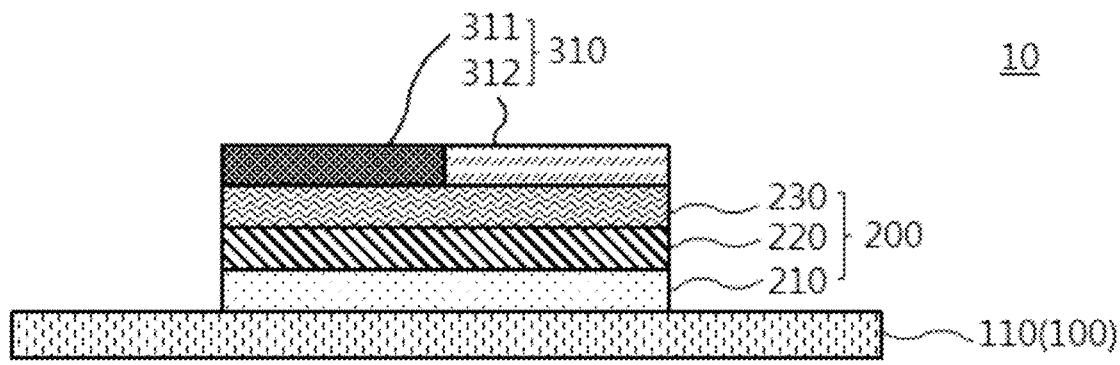
FIG. 7 is a side view showing a GHB detector sticker according to another embodiment of the present disclosure.
Figure 8:
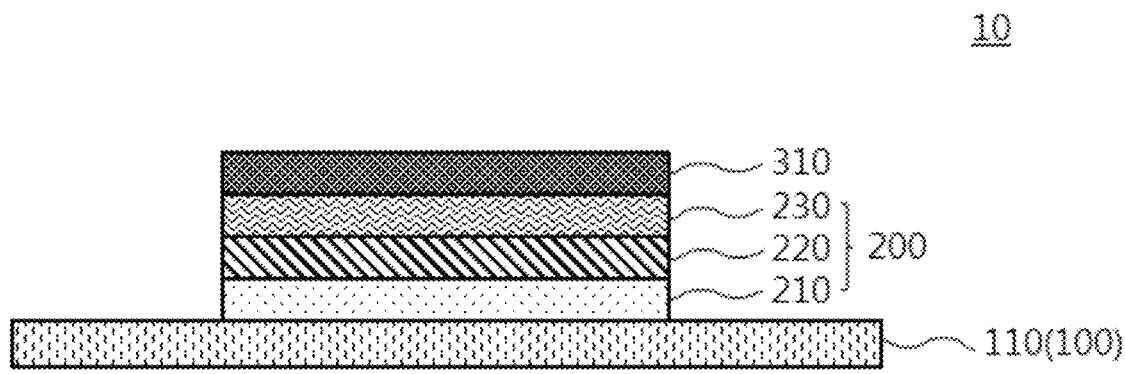
FIG. 8 is a side view showing a GHB detector sticker according to another embodiment of the present disclosure.
Figure 9:
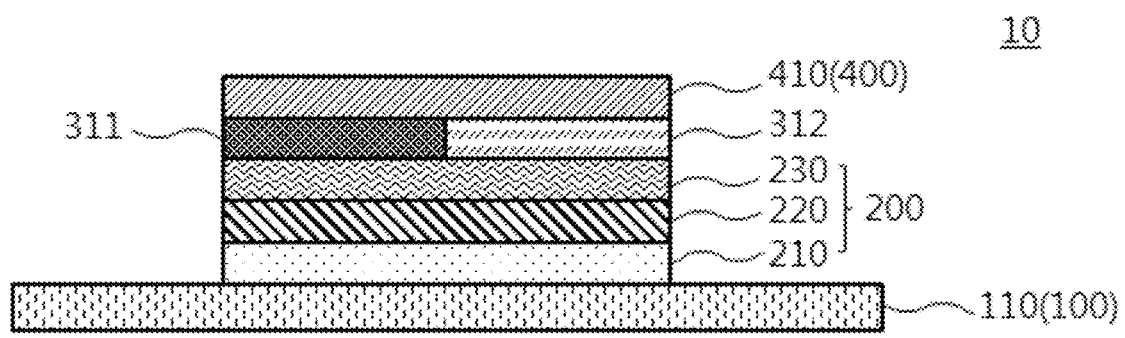
FIG. 9 is a side view showing a GHB detector sticker according to another embodiment of the present disclosure.
Figure 10:
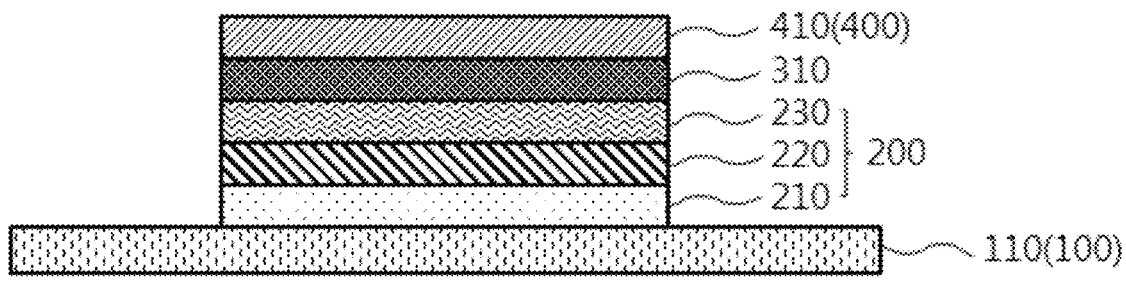
FIG. 10 is a side view showing a GHB detector sticker according to another embodiment of the present disclosure.
Figure 11:
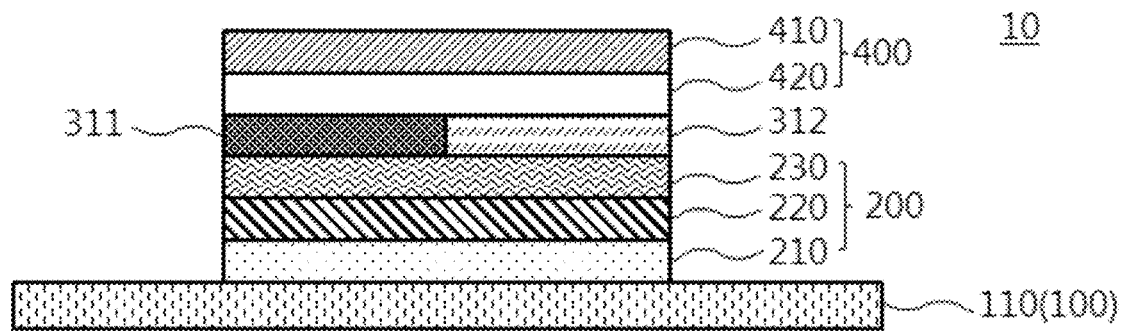
FIG. 11 is a side view showing a GHB detector sticker according to another embodiment of the present disclosure.
Figure 12:
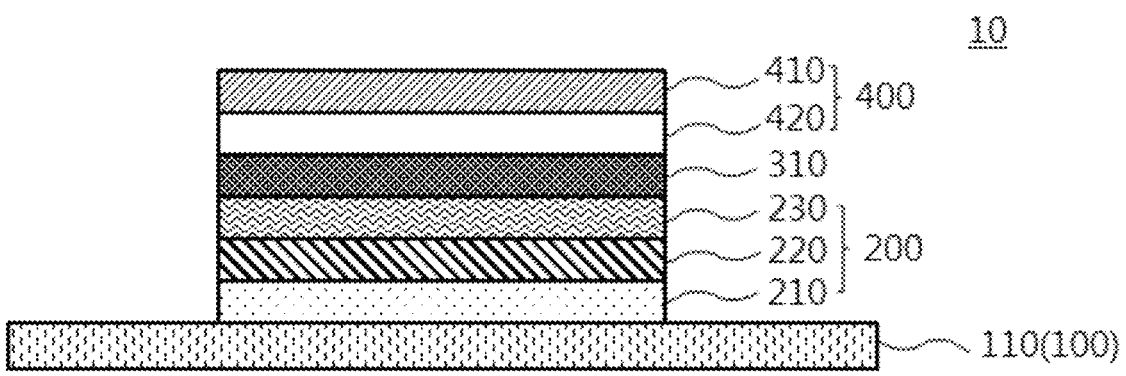
FIG. 12 is a side view showing a GHB detector sticker according to another embodiment of the present disclosure.
Figure 13:
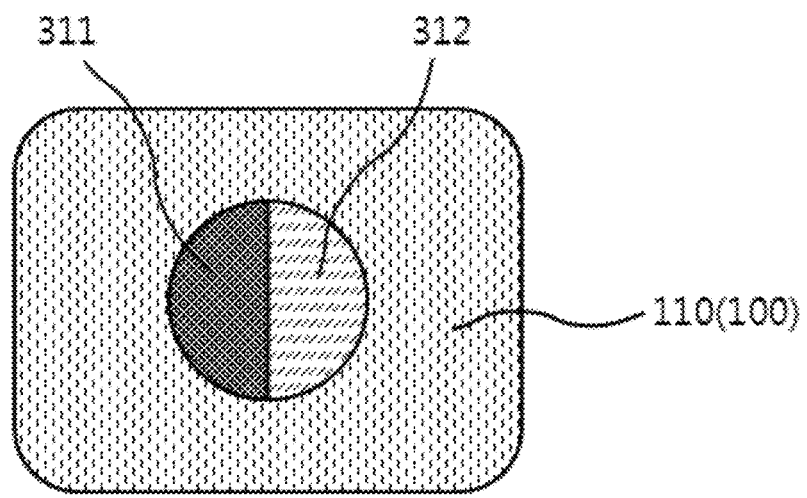
FIG. 13 is a top view showing a GHB detector sticker according to an embodiment of the present disclosure.
Figure 14:
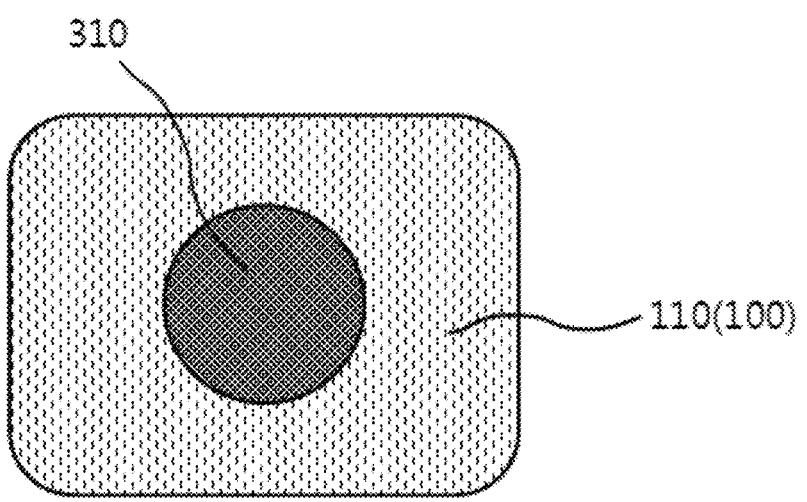
FIG. 14 is a top view showing a GHB detector sticker according to another embodiment of the present disclosure.
Figure 15:
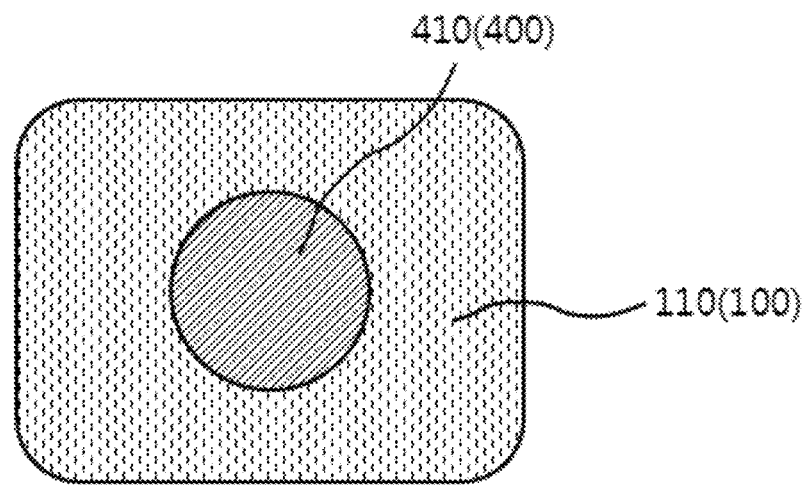
FIG. 15 is a top view showing a GHB detector sticker according to another embodiment of the present disclosure.

The present disclosure may be embodied in many different forms, and should not be construed as being limited only to the embodiments set forth herein, but should be understood to cover all modifications, equivalents or alternatives falling within the spirit and technical scope of the present disclosure. In the description of the present disclosure, detailed descriptions of related known techniques incorporated herein will be omitted when the same may make the gist of the present disclosure unclear.

As used herein, the terms "first", "second", etc. may be used to describe various elements, but these elements are not to be limited by these terms. These terms are only used to distinguish one element from another. For example, a first element may be termed a second element, and similarly, a second element may be termed a first element, without departing from the scope of the present disclosure.

Further, it will be understood that when an element is referred to as being "formed", "positioned" or "stacked" on another element, it can be formed, positioned or stacked so as to be directly attached to all surfaces or one surface of the other element, or intervening elements may be present therebetween.

Unless otherwise stated, a singular expression includes the plural sense. In this application, the terms "comprise", "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

FIGS. 1 to 12 are side views showing the GHB detector sticker according to embodiments of the present disclosure, and FIGS. 13 to 16 are top views showing the GHB detector sticker according to embodiments of the present disclosure.

With reference to FIGS. 1 to 16, the GHB detector sticker 10 according to the present disclosure is described below.

The present disclosure pertains to a GHB detector sticker 10 for detecting GHB (gamma-hydroxybutyric acid) or salts thereof, including a first release portion 100, an adhesive portion 200, and a detection portion 300.

First Release Portion 100

The GHB detector sticker 10 of the present disclosure may include a first release portion 100 including a first release sheet 110.

Adhesive Portion 200

With reference to FIGS. 1 to 6, the GHB detector sticker 10 of the present disclosure may include an adhesive portion 200, which is formed on the first release sheet 110 and includes a first adhesive layer 210.

With reference to FIGS. 7 to 12, the adhesive portion 200 may further include a substrate 220 formed on the first adhesive layer 210 and a second adhesive layer 230 formed on the substrate 220.

Detection Portion 300

The GHB detector sticker 10 of the present disclosure may include a detection portion 300, which is formed on the first adhesive layer 210 and includes a thin film 310 and a detection reagent composition dispersed in a part 311 of or throughout the thin film 310.

The detection reagent composition may be dispersed in the part 311 of the thin film 310, and ink having the same color as the color of the detection reagent composition may be dispersed in the remaining part 312 of the thin film 310.

The thin film 310 may include at least one selected from the group consisting of nitrocellulose, polyvinylidene fluoride (PVDF), polypropylene (PP), polyethylene (PE), polysulfone (PS), polytetrafluoroethylene (PTFE), polyimide (PI), polyethylene terephthalate (PET), and poly(ethylene naphthalate) (PEN).

The detection reagent composition may include at least one selected from the group consisting of a dehydrogenase of GHB (gamma-hydroxybutyric acid) or salts thereof, a coenzyme, a coenzyme dehydrogenase, a chromogen, and a dye.

The dehydrogenase of GHB or salts thereof may include at least one selected from the group consisting of glucuronate reductase, hydroxyacid-oxoacid transhydrogenase, and 4-hydroxybutyrate-CoA ligase.

The coenzyme may include at least one selected from the group consisting of NAD (nicotinamide adenine dinucleotide), NADP (nicotinamide adenine dinucleotide phosphate), nicotinamide 1,N6-ethenoadenine dinucleotide, and nicotinamide 1,N6-ethenoadenine dinucleotide phosphate, and preferably includes NAD.

The coenzyme dehydrogenase may include at least one selected from the group consisting of diaphorase, cytochrome b5 reductase, aflatoxin aldehyde reductase, and flavin reductase, and preferably includes diaphorase.

The chromogen may include at least one selected from the group consisting of a tetrazolium salt, tetrazolium blue chloride, methylene blue, 2,6-dichlorophenolindophenol, resazurin, Fe(III)-phenanthroline complex, alamarBlue, nitro blue tetrazolium, and nitro blue tetrazolium chloride (NBT), and preferably includes tetrazolium blue chloride.

Figure 20:
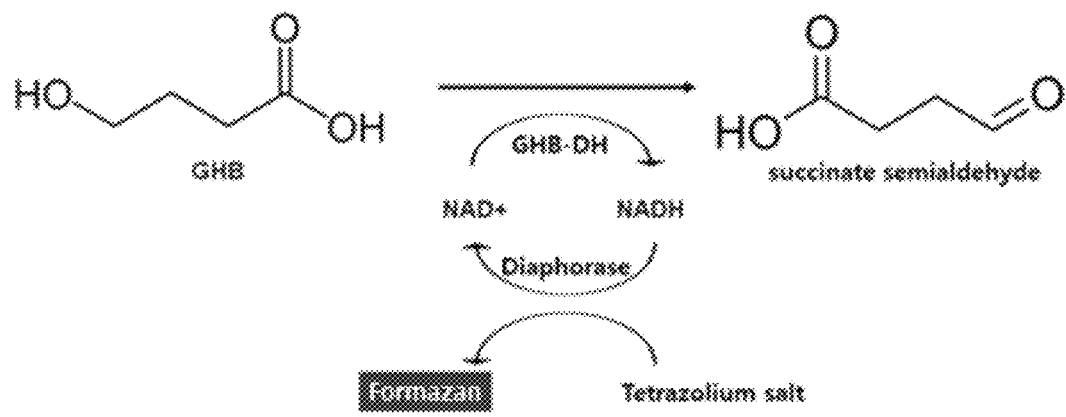
FIG. 20 schematically shows the principle by which GHB is detected.

FIG. 20 schematically shows the principle by which GHB is detected. With reference to FIG. 20, the dehydrogenase of GHB or salts thereof oxidizes GHB into succinate semialdehyde (SSA), and simultaneously reduces the oxidized form of coenzyme into the reduced form of coenzyme. The coenzyme dehydrogenase oxidizes the reduced form of coenzyme, and simultaneously converts the chromogen to develop color, thereby detecting GHB through color change.

When the detection reagent composition contains the dye, GHB is non-enzymatically detected.

The dye may include at least one selected from the group consisting of 5,10,15,20-tetraphenyl-21H,23H-porphine, 5,10,15,20-tetrakis(4-sulfonatophenyl)-21H,23H-porphine manganese (III) chloride, zinc meso-tetraphenylporphine, malachite green, brilliant green, bromophenol blue, methyl orange, naphthyl red, bromocresol green, methyl red, chlorophenol red, bromocresol purple, bromothymol blue, phenol red, thymol blue, fluorescein, Eriochrome black T, Variamine blue B salt, Reichardt's dye, Nile red, and bromopyrogallol red, and preferably includes at least one selected from the group consisting of bromocresol green and bromopyrogallol red.

The adhesive portion 200 and the detection portion 300 may have the same shapes as each other.

Each of the adhesive portion 200 and the detection portion 300 may have a circular shape, and the diameter of each of the adhesive portion 200 and the detection portion 300 may be 0.1 to 4 cm.

Here, a diameter thereof less than 0.1 cm makes it difficult to attain visibility, which is undesirable. On the other hand, a diameter thereof exceeding 4 cm may result in unnecessary or excessive consumption of raw materials when manufacturing a single-use sticker, which is undesirable.

The part 311 of the thin film 310 may be a semicircle, that is, half of the circular shape.

Second Release Portion 400

The GHB detector sticker 10 of the present disclosure may further include a second release portion 400, which is formed on the thin film 310 and includes a second release sheet 410.

Two or more selected from the group consisting of the adhesive portion 200, the detection portion 300, and the second release portion 400 may have shapes similar to each other.

Two or more selected from the group consisting of the adhesive portion 200, the detection portion 300, and the second release portion 400 may have the same shapes as each other.

Each of the adhesive portion 200, the detection portion 300 and the second release portion 400 may have a circular shape, and the diameter of each of the adhesive portion 200, the detection portion 300 and the second release portion 400 may be 0.1 to 4 cm.

Figure 16:
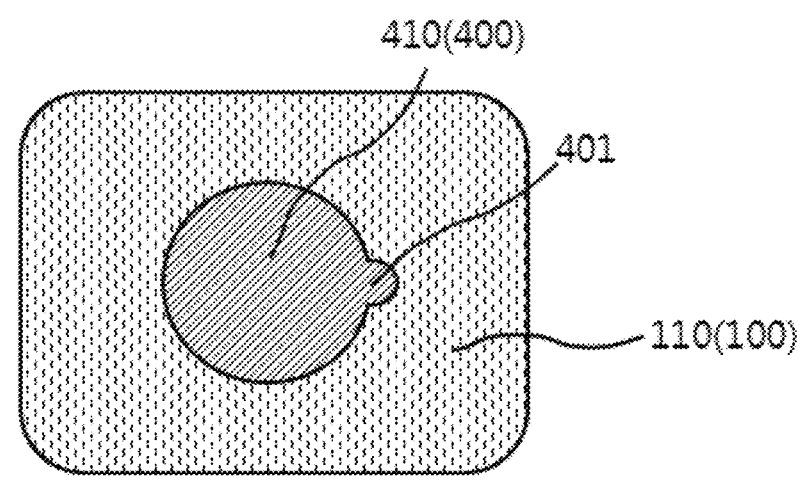
FIG. 16 is a top view showing a GHB detector sticker according to another embodiment of the present disclosure.

With reference to FIG. 16, each of two or more selected from the group consisting of the adhesive portion 200, the detection portion 300, and the second release portion 400 may include a protrusion 201, 301, 401 protruding in a planar direction at a predetermined position thereof.

The second release sheet 410 may be transparent.

With reference to FIGS. 5, 6, 11 and 12, the second release portion 400 may further include a third adhesive layer 420 between the second release sheet 410 and the thin film 310.

Adhesion between the third adhesive layer 420 and the second release sheet 410 is very strong and thus these layers do not separate from each other, whereas adhesion between the third adhesive layer 420 and the thin film 310 is weak, and thus these layers may separate from each other.

Figure 18:
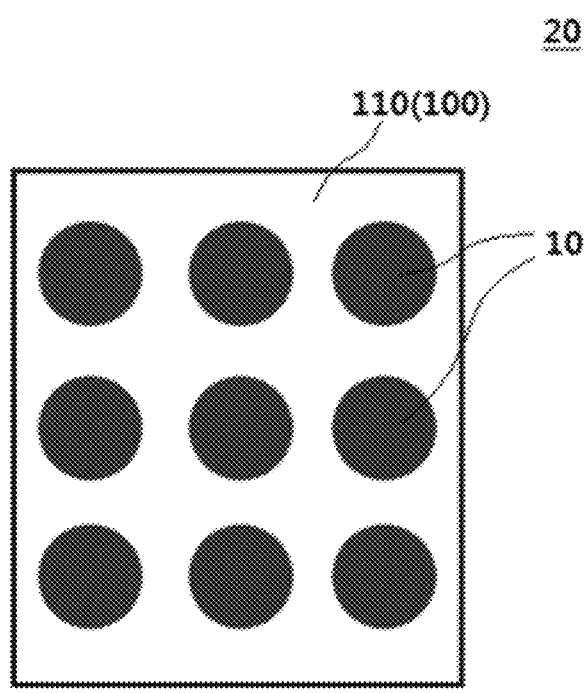
FIG. 18 is a top view showing a GHB detector sticker array according to the present disclosure.

FIG. 18 is a top view showing a GHB detector sticker array 20 according to the present disclosure. With reference to FIG. 18, the GHB detector sticker array 20 according to the present disclosure is described below.

In addition, the present disclosure pertains to a GHB detector sticker array 20 including GHB detector stickers 10, in which each of the GHB detector stickers is as described above.

Figure 19:
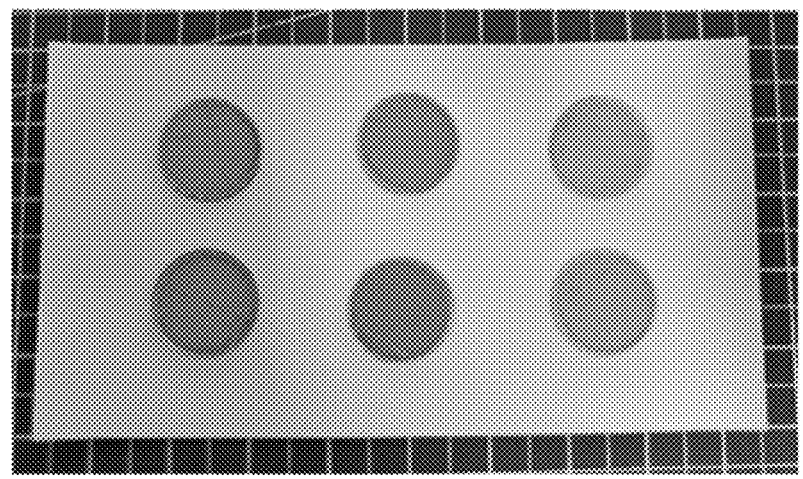
FIG. 19 is an image showing the GHB detector sticker array according to the present disclosure.

FIG. 19 is an image showing the GHB detector sticker array according to the present disclosure. With reference to FIG. 19, the initial color may be different for each sticker depending on the type of dye.

In addition, the present disclosure pertains to a method of manufacturing the GHB detector sticker 10, which is described below.

First, a first release sheet 110 is attached to one surface of a first adhesive layer 210 and a thin film 310 is attached to the remaining surface thereof, thus manufacturing a thin film 310/first adhesive layer 210/first release sheet 110 (step a).

Subsequently, a part 311 of or throughout the thin film 310 of the thin film 310/first adhesive layer 210/first release sheet 110 is screen-printed with a detection reagent composition, thus manufacturing a detection portion 300/first adhesive layer 210/first release sheet 110 configured such that the detection portion includes the thin film 310 and the detection reagent composition dispersed in the part 311 of or throughout the thin film 310 (step b).

In one exemplary embodiment, step (b) may include (b-1) forming a printing portion having a mesh hole having the same shape as the shape of the part 311 of the thin film in a screen mesh, (b-2) preparing a mixed solution including a detection reagent composition and a binder, (b-3) printing ink having the same color as the color of the detection reagent composition on a region corresponding to the remaining part 312 of the thin film 310 of the thin film 310/first adhesive layer 210/first release sheet 110, and (b-4) positioning the screen mesh having the printing portion on the thin film 310 of the thin film 310/first adhesive layer 210/first release sheet 110 and screen-printing a region corresponding to the printing portion with the mixed solution, thus manufacturing a detection portion 300/first adhesive layer 210/first release sheet 110 configured such that the detection portion includes the thin film 310 and the detection reagent composition dispersed in the part 311 of the thin film 310.

In another exemplary embodiment, step (b) may include (b-1') forming a printing portion having a mesh hole having the same shape as the shape of the detection portion 300 in a screen mesh, (b-2') preparing a mixed solution including a detection reagent composition and a binder, and (b-3') positioning the screen mesh having the printing portion on the thin film 310 of the thin film 310/first adhesive layer 210/first release sheet 110 and screen-printing a region corresponding to the printing portion with the mixed solution, thus manufacturing a detection portion 300/first adhesive layer 210/first release sheet 110 configured such that the detection portion includes the thin film 310 and the detection reagent composition dispersed throughout the thin film 310.

After step (b), the method of the present disclosure may further include (b') coating the detection portion 300 of the detection portion 300/first adhesive layer 210/first release sheet 110 with a second release sheet 410.

Subsequently, the first adhesive layer 210 and the detection portion 300 of the detection portion 300/first adhesive layer 210/first release sheet 110 are cut, thus manufacturing the GHB detector sticker 10 (step c).

The GHB detector sticker 10 is the same as the GHB detector sticker 10 of the present disclosure described above, and therefore, for a description thereof, reference is to be made to the above description.

In one exemplary embodiment, step (c) may be (c') manufacturing the GHB detector sticker 10 by cutting the first adhesive layer 210 and the detection portion 300 of the detection portion 300/first adhesive layer 210/first release sheet 110 so as to have the same shapes as each other.

In another exemplary embodiment, step (c) may be (c") manufacturing the GHB detector sticker 10 by cutting two or more selected from the group consisting of the first adhesive layer 210, the detection portion 300 and the second release sheet 410 of the detection portion 300 coated with the second release sheet 410/first adhesive layer 210/first release sheet 110 so as to have shapes similar to each other.

EXAMPLES

A better understanding of the present disclosure may be obtained through the following examples, which are merely set forth to illustrate the present disclosure and are not to be construed as limiting the scope of the present disclosure.

Example 1: Manufacture of GHB Detector Sticker Containing Bromopyrogallol Red (BPR) as Dye and Including BPR Dispersed in Circular Shape With reference to FIGS. 12 and 15, chromatography paper (Whatman, Cellulose chromatography paper 1CHR, Catalogue-3001-653) was attached to one surface of a laminate of double-sided adhesives 210, 220, 230 (Hanbyul Digital (OAZONE.net), an A4-sized double-sided adhesive sheet), and a release sheet 110 was attached to the remaining surface thereof.

A circular mesh hole having a diameter of 15 mm was formed in a screen mesh. A water-soluble binder for screen printing (Seojin Trading Co. Ltd., Printing Paste 5 Blank) was mixed with 1 mg/ml of a BPR dye to afford a mixed solution.

The screen mesh having therein the mesh hole was positioned on the chromatography paper, and screen-printing with the mixed solution was performed, followed by drying at 80° C. for 1 hr, thus manufacturing a detection portion 300.

The upper surface of the detection portion 300 was coated with transparent release sheets 410, 420. Thereafter, blade cutting into a circular shape was performed such that the double-sided adhesives 210, 220, 230, the detection portion 300, and the transparent release sheets 410, 420 had the same shapes as each other, thereby manufacturing a GHB detector sticker 10.

Figure 17A:
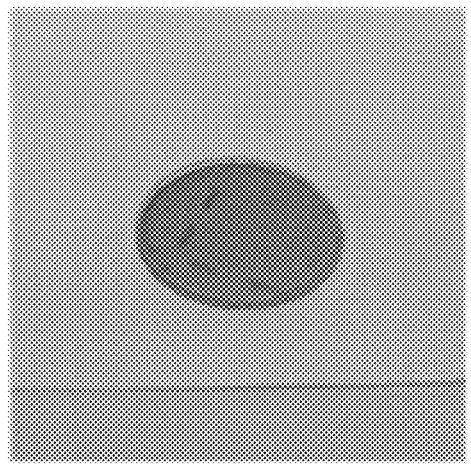
FIG. 17A is an image showing the GHB detector sticker manufactured in Example 2.
Figure 17B:
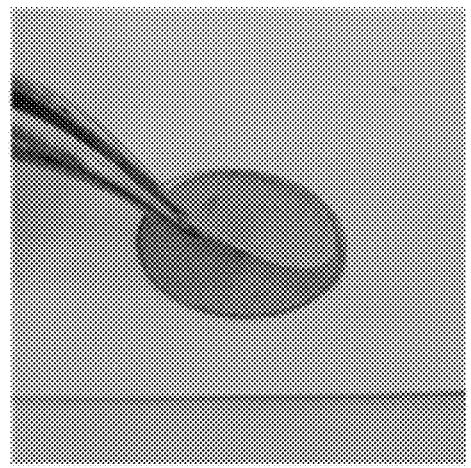
FIG. 17B is an image showing the separation of the second release portion 400 of the GHB detector sticker.
Figure 17C:
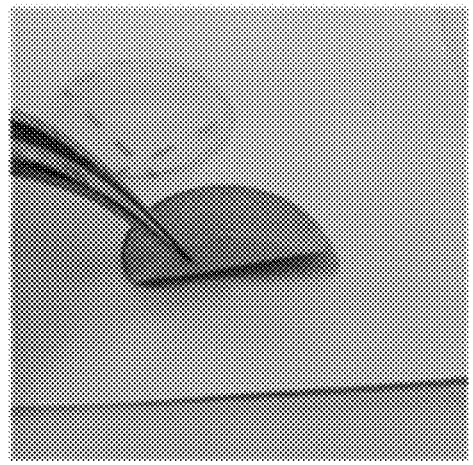
FIG. 17C is an image showing the separation of the detection portion 300 of the GHB detector sticker.

Example 2: Manufacture of GHB Detector Sticker Containing Bromocresol Green (BCG) as Dye and Including BCG Dispersed in Circular Shape With reference to FIGS. 12, 15 and 17, a GHB detector sticker was manufactured in the same manner as in Example 1, with the exception that BCG was used as the dye, in lieu of BPR.

Example 3: Manufacture of GHB Detector Sticker Having Protrusion and Containing BPR as Dye With reference to FIGS. 12 and 16, a GHB detector sticker 10 was manufactured in the same manner as in Example 1, with the exception that cutting into a circular shape having protrusions 201, 301, 401 protruding in the planar direction at respective predetermined positions of the double-sided adhesives 210, 220, 230, the detection portion 300 and the transparent release sheets 410, 420 was performed, rather than cutting into a circular shape.

Example 4: Manufacture of GHB Detector Sticker Having Protrusion and Containing BCG as Dye A GHB detector sticker 10 was manufactured in the same manner as in Example 1, with the exception that BCG was used as the dye in lieu of BPR, and cutting into a circular shape having protrusions 201, 301, 401 protruding in the planar direction at respective predetermined positions of the double-sided adhesives 210, 220, 230, the detection portion 300 and the transparent release sheets 410, 420 was performed, rather than cutting into a circular shape.

Example 5: Manufacture of GHB Detector Sticker Containing BPR as Dye and Including BPR Dispersed in Semicircular Shape With reference to FIGS. 7 and 13, chromatography paper (Whatman, Cellulose chromatography paper 1CHR, Catalogue-3001-653) was attached to one surface of a laminate of double-sided adhesives 210, 220, 230 (Hanbyul Digital (OAZONE.net), an A4-sized double-sided adhesive sheet) and a release sheet 110 was attached to the remaining surface thereof.

A semicircular mesh hole having a diameter of 15 mm was formed in a screen mesh. A water-soluble binder for screen printing (Seojin Trading Co. Ltd., Printing Paste 5 Blank) was mixed with 1 mg/ml of a BPR dye to afford a mixed solution.

Ink (Canon GI-990, a total of four types, namely C, M, Y, and BK) was inkjet-printed in a semicircular shape having a diameter of 15 mm on the chromatography paper using an inkjet printer (Canon G3010).

In order to form the remaining semicircle, the screen mesh having therein the mesh hole was positioned on the ink-printed chromatography paper, and screen-printing with the mixed solution was performed, followed by drying at 80° C. for 1 hr, thus manufacturing a detection portion 300.

Thereafter, blade cutting into a circular shape was performed such that the double-sided adhesives 210, 220, 230 and the detection portion 300 had the same shapes as each other, thereby manufacturing a GHB detector sticker 10.

Figure 24A:
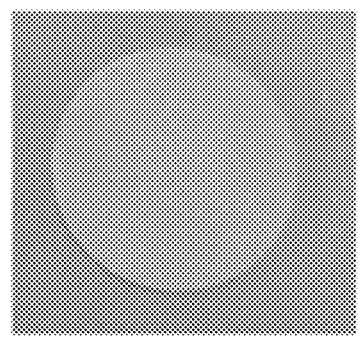
FIG. 24A is an image showing the GHB detector sticker manufactured in Example 6.

Example 6: Manufacture of GHB Detector Sticker Containing BCG as Dye and Including BCG Dispersed in Semicircular Shape With reference to FIGS. 7, 13 and 24A, a GHB detector sticker 10 was manufactured in the same manner as in Example 5, with the exception that BCG was used as the dye, in lieu of BPR.

TEST EXAMPLE

Test Example 1: Detection of GHB

Figure 21:
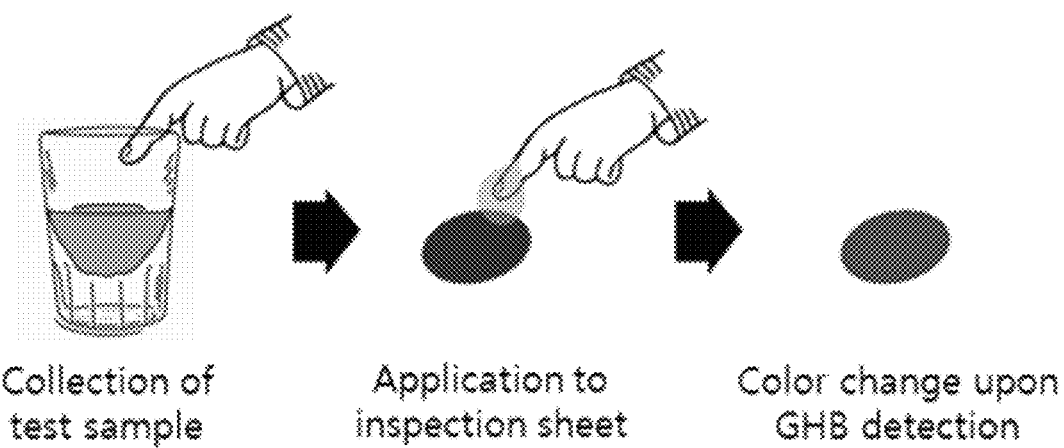
FIG. 21 schematically shows a process of detecting GHB using the GHB detector sticker according to the present disclosure.

With reference to FIG. 21, distilled water containing 4 mg/ml of GHB was regarded as positive and distilled water not containing GHB was regarded as negative, and the colors of positive and negative reactions were observed after application of distilled water to the detection portion of the GHB detector sticker manufactured in each of Examples 1 and 2.

In addition, 1 mg/ml of GHB was mixed with each of 4 types of alcoholic drinks, namely soju, beer, makgeolli and hard liquor, after which the resulting mixture was applied to the detection portion of the GHB detector sticker manufactured in each of Examples 1 and 2, and a change in color was observed.

Figure 22:
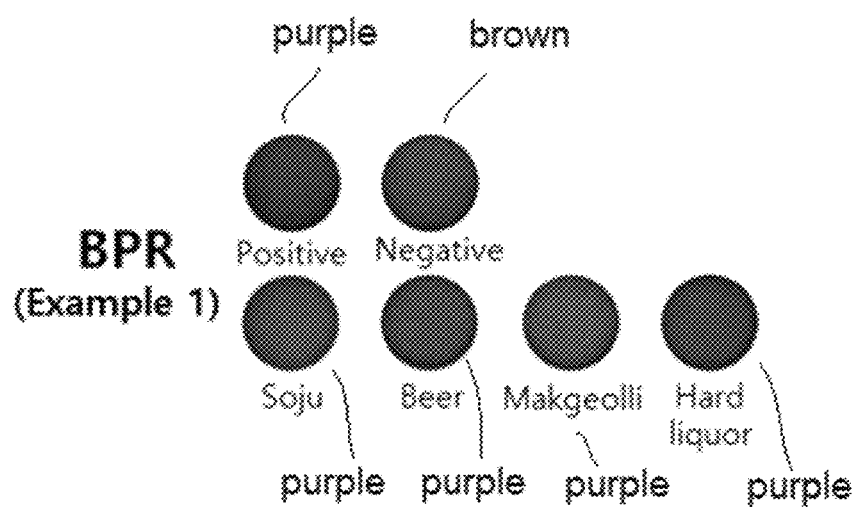
FIG. 22 shows the results of detection of GHB using the GHB detector sticker manufactured in Example 1.
Figure 23:
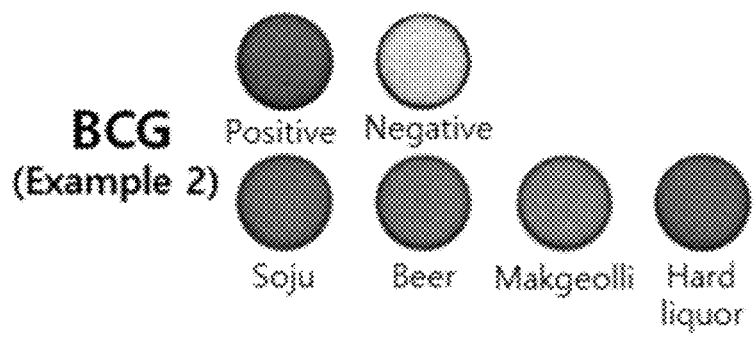
FIG. 23 shows the results of detection of GHB using the GHB detector sticker manufactured in Example 2.

The results of the GHB detector sticker manufactured in Example 1 are shown in FIG. 22 and the results of the GHB detector sticker manufactured in Example 2 are shown in FIG. 23. With reference to FIGS. 22 and 23, a positive reaction for GHB was confirmed in soju, beer, makgeolli, and hard liquor. In FIGS. 22 and 23, the concentration of GHB mixed with alcoholic drinks is set to 1 mg/ml, so there may be a slight difference from the color of a positive reaction in the case of 4 mg/ml.

Figure 24B:
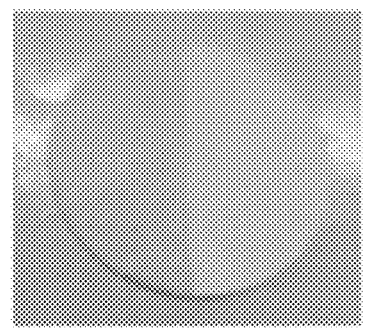
FIG. 24B is an image showing the state after application of GHB to the GHB detector sticker.

5 mg/ml of GHB was applied to the detection portion of the GHB detector sticker manufactured in Example 6, and a change in color was observed. The results thereof are shown in FIG. 24B. With reference to FIG. 24B, since half thereof maintained the color before the reaction, it was possible to clearly confirm whether a positive reaction occurred.

Although preferred embodiments of the present disclosure have been disclosed for illustrative purposes, those skilled in the art will appreciate that diverse variations and modifications are possible through addition, alteration, deletion, etc. of elements, without departing from the spirit or scope of the disclosure. For example, respective elements described in an integrated form may be discretely used, or discrete elements may be used in the state of being combined. The scope of the disclosure is defined by the claims below rather than the aforementioned detailed description, and all changes or modified forms that are capable of being derived from the meaning, range, and equivalent concepts of the appended claims should be construed as being included in the scope of the present disclosure.

What is claimed is:

1. A gamma-hydroxybutyric acid (GHB) detector sticker for detecting GHB or salts thereof, comprising:
    a first release portion comprising a first release sheet;
    an adhesive portion formed on the first release sheet and comprising a first adhesive layer;
    a detection portion formed on the first adhesive layer and comprising a thin film and a detection reagent composition dispersed in a part of or throughout the thin film; and
    a second release portion formed on the thin film and comprising a second release sheet.

2. The GHB detector sticker of claim 1, wherein the detection reagent composition is dispersed in the part of the thin film, and
    ink having a same color as a color of the detection reagent composition is dispersed in a remaining part of the thin film.

3. The GHB detector sticker of claim 1, wherein the adhesive portion and the detection portion have same shapes as each other.

4. The GHB detector sticker of claim 3, wherein each of the adhesive portion and the detection portion has a circular shape, and
    a diameter of each of the adhesive portion and the detection portion is 0.1 to 4 cm.

5. The GHB detector sticker of claim 4, wherein the part of the thin film is a semicircle, that is, half of the circular shape.

6. The GHB detector sticker of claim 1, wherein the adhesive portion further comprises a substrate formed on the first adhesive layer and a second adhesive layer formed on the substrate.

7. The GHB detector sticker of claim 1, wherein at least two selected from the group consisting of the adhesive portion, the detection portion and the second release portion have shapes similar to each other.

8. The GHB detector sticker of claim 7, wherein at least two selected from the group consisting of the adhesive portion, the detection portion and the second release portion have same shapes as each other.

9. The GHB detector sticker of claim 8, wherein each of the adhesive portion, the detection portion and the second release portion has a circular shape, and
    a diameter of each of the adhesive portion, the detection portion and the second release portion is 0.1 to 4 cm.

10. The GHB detector sticker of claim 8, wherein each of at least two selected from the group consisting of the adhesive portion, the detection portion and the second release portion comprises a protrusion protruding in a planar direction at a predetermined position thereof.

11. The GHB detector sticker of claim 6, wherein the second release sheet is transparent.

12. The GHB detector sticker of claim 6, wherein the second release portion further comprises a third adhesive layer between the second release sheet and the thin film.

13. A GHB detector sticker array comprising GHB detector stickers, wherein each of the GHB detector stickers is the GHB detector sticker of claim 1.

14. A method of manufacturing a GHB detector sticker for detecting GHB or salts thereof, comprising:
    (a) manufacturing a thin film/first adhesive layer/first release sheet by attaching a first release sheet to one surface of a first adhesive layer and attaching a thin film to a remaining surface thereof;
    (b) manufacturing a detection portion/first adhesive layer/first release sheet configured such that the detection portion comprises the thin film and a detection reagent composition dispersed in a part of or throughout the thin film by screen-printing the part of or throughout the thin film of the thin film/first adhesive layer/first release sheet with the detection reagent composition; and
    (c) manufacturing the GHB detector sticker of claim 1 by cutting the first adhesive layer and the detection portion of the detection portion/first adhesive layer/first release sheet.

15. The method of claim 14, wherein step (b) comprises:
    (b-1) forming a printing portion having a mesh hole having a same shape as a shape of the part of the thin film in a screen mesh;
    (b-2) preparing a mixed solution comprising a detection reagent composition and a binder;
    (b-3) printing ink having a same color as a color of the detection reagent composition on a region corresponding to a remaining part of the thin film of the thin film/first adhesive layer/first release sheet; and
    (b-4) positioning the screen mesh having the printing portion on the thin film of the thin film/first adhesive layer/first release sheet and screen-printing a region corresponding to the printing portion with the mixed solution, thus manufacturing a detection portion/first adhesive layer/first release sheet configured such that the detection portion comprises the thin film and the detection reagent composition dispersed in the part of the thin film.

16. The method of claim 14, wherein step (b) comprises:
    (b-1') forming a printing portion having a mesh hole having a same shape as a shape of the detection portion in a screen mesh;
    (b-2') preparing a mixed solution comprising a detection reagent composition and a binder; and
    (b-3') positioning the screen mesh having the printing portion on the thin film of the thin film/first adhesive layer/first release sheet and screen-printing a region corresponding to the printing portion with the mixed solution, thus manufacturing a detection portion/first adhesive layer/first release sheet configured such that the detection portion comprises the thin film and the detection reagent composition dispersed throughout the thin film.

17. The method of claim 14, wherein step (c) is (c') manufacturing the GHB detector sticker of claim 1 by cutting the first adhesive layer and the detection portion of the detection portion/first adhesive layer/first release sheet so as to have same shapes as each other.

18. The method of claim 14, further comprising (b') coating the detection portion of the detection portion/first adhesive layer/first release sheet with a second release sheet, after step (b).

19. The method of claim 18, wherein step (c) is (c") manufacturing the GHB detector sticker of claim 1 by cutting at least two selected from the group consisting of the first adhesive layer, the detection portion and the second release sheet of the detection portion coated with the second release sheet/first adhesive layer/first release sheet so as to have shapes similar to each other.

* * * * *